United States Patent [19]

Farr et al.

[11] Patent Number: 4,602,705
[45] Date of Patent: Jul. 29, 1986

[54] FLYWHEEL MECHANISM FOR ANTI-SKID BRAKING SYSTEMS

[75] Inventors: Glyn Phillip R. Farr, Leek Wootton; Ivan Mortimer, Solihull, both of England

[73] Assignee: Lucas Industries public limited company, Birmingham, England

[21] Appl. No.: 438,598

[22] Filed: Nov. 2, 1982

[30] Foreign Application Priority Data

Nov. 9, 1981 [GB] United Kingdom ............... 8133770

[51] Int. Cl.⁴ .................................................. B60T 8/00
[52] U.S. Cl. ................................... 188/181 A; 303/116
[58] Field of Search ................... 303/116; 188/181 A, 188/181 R

[56] References Cited

U.S. PATENT DOCUMENTS

| 3,441,320 | 4/1969 | Flory | 188/181 A |
| 4,353,440 | 10/1982 | Farr | 303/116 X |
| 4,377,221 | 3/1983 | Farr | 188/181 A |

FOREIGN PATENT DOCUMENTS

| 1953164 | 4/1974 | Fed. Rep. of Germany | 303/116 |
| 1040771 | 9/1966 | United Kingdom | 188/181 A |
| 2027832 | 2/1980 | United Kingdom | |
| 2029914 | 3/1980 | United Kingdom | 188/181 A |
| 2070166 | 9/1981 | United Kingdom | 188/181 A |
| 281176 | 12/1970 | U.S.S.R. | 188/181 A |

Primary Examiner—Gary L. Smith
Assistant Examiner—Rodney M. Lindsey
Attorney, Agent, or Firm—Scrivener Clarke Scrivener and Johnson

[57] ABSTRACT

The concern is with reducing the deceleration rate of an over-running flywheel following actuation of an associated camming means, by reducing the torque of an axially biassed clutch, to provide a more reliable wheel speed analogue. In one construction the clutch may consist of two clutch discs engaging with the thrust member of a camming means. The clutch torque is reduced following expansion of the camming means by reducing the frictional engagement force between one disc and the thrust member, this being effected by a change in the mechanical advantage of a lever acting on the flywheel as the lever accommodates expansion of the camming means. In another construction the fluid pressure force on a clutch biassing piston is varied to vary the clutch torque, and in yet other arrangements, a magnetic clutch biassing force is varied.

12 Claims, 8 Drawing Figures

FLYWHEEL MECHANISM FOR ANTI-SKID BRAKING SYSTEMS

SPECIFIC DESCRIPTION

This invention relates to flywheel mechanisms for anti-skid braking systems of the kind comprising a rotatable shaft adapted to be driven by a braked wheel, a flywheel which is angularly movable with respect to the shaft, camming means acting between a thrust member and the flywheel and through which rotation of the shaft is imparted to the flywheel from the thrust member, the camming means being so constructed and arranged that relative rotation between the flywheel and the thrust member as a result of excessive deceleration of the thrust member relative to the flywheel is accompanied by relative movement between the flywheel and the thrust member in an axial direction to operate pressure-regulating means controlling a brake-applying fluid pressure, and a clutch which permits the flywheel to overrun the shaft against the clutch torque. Such a flywheel mechanism will hereinafter be referred to as a 'flywheel mechanism of the kind set forth'.

Examples of flywheel mechanisms of the kind set forth are to be found in our published Patent applications G.B. Nos. 2027832 and 2066912 filed Aug. 14, 1979 and Aug. 21, 1978 respectively. The clutch employed in these arrangements has an axially biassed frictional engagement between the clutch driving and driven members.

With such flywheel mechanisms it is important to ensure that the clutch does not slip before the camming means is actuated, and accordingly it has been the practice to arrange the axially biassed clutch so that it will slip at a torque which is considerably greater than the torque required to cause actuation of the camming means. Typically, for a motorcycle brake the clutch is set to transmit before slipping a torque which is twice the torque at which the camming means actuation is initiated.

During a skid cycle of brake release and re-apply, and following release of the brake by the camming means, the torque of the over-running clutch determines the rate at which the flywheel is decelerated relative to the shaft, and the decelerating flywheel thereby provides a vehicle speed analogue with which the shaft speed is compared by the camming means to determine the point at which the brakes are re-applied, when the shaft speed and the flywheel speed become the same again.

These known arrangements can be made to work satisfactorily in controlling the braking of motorcycle and car wheels by using certain types of modulators, but we have realised that such arrangements would not be suitable for heavy commercial vehicles where such modulators could not be employed. We forsee a problem that would arise with heavy vehicles due to their high inertia wheels and high hysteresis brakes. Another problem is that in order to prevent unncessary release of the brakes due to false signals arising from tyre wind up it is normally necessary to set the deceleration threshold of the camming means at about 1.2 g, whereas the normal maximum deceleration of a commercial vehicle is about 0.6 g. In order to prevent premature slipping of the clutch the clutch torque would need to be set to withstand a deceleration of the flywheel relative to the shaft of about 2.4 g. The high inertia of the wheels of a commercial vehicle and the high hysteresis brakes result in very slow recovery of the wheel speed during a brake release/re-apply cycle. In this circumstance the overrunning flywheel, decelerating at about 2.4 g as compared with the maximum vehicle deceleration of 0.6 g, would provide an unsatisfactory wheel speed analogue for comparison with the shaft speed to determine the brake re-application point, since the brakes would normally be re-applied much too early in the wheel speed cycle. There would be a serious danger of the wheel speed cascading to zero.

We have realised that this problem can be largely overcome by arranging for the axial biassing force on the clutch to be reduced following camming means actuation thereby to reduce the deceleration of the flywheel during overrunning of the flywheel from that deceleration value that the flywheel would have if it were being decelerated by the clutch applying the torque value corresponding to the normal setting of the clutch.

The deceleration rate of the over-running flywheel can therefore be made to provide a more accurate analogue of the vehicle speed. Whilst this will be of benefit to heavy vehicles in particular, advantages will also be achieved in applying the invention to motorcycles and cars.

A reduction in clutch torque on overrunning of the flywheel was a characteristic inevitably associated with the use of a spiral clutch spring in the arrangements of Specification G.B. Nos. 964,612 and 1,042,746. This characteristic appears to have been largely undesirable since the latter specification is concerned with a problem of clutch slipping prior to camming means actuation.

According to the present invention in a flywheel mechanism of the kind set forth the clutch comprises an axially biassed frictional engagement between clutch driving and driven surfaces, and means is provided to reduce the clutch torque from its normal setting following camming means actuation.

The clutch torque setting is reduced simultaneously with or subsequent to the generation of a brake release signal.

Variation of the clutch torque may be achieved in various ways.

In one arrangement for reducing the clutch torque the clutch is biassed by a movable wall subject to fluid pressure forces which are varied to reduce the loading of the clutch in response to actuation of the camming means.

Preferably actuation of the camming means is then arranged to operate a pressure relief valve to reduce the fluid pressure loading on the clutch.

Conveniently the movable wall comprises a piston and a pressure space bounded by the piston is connected through a restrictor with a treadle valve.

The piston may act as a valve spool of the relief valve.

Movement of the movable wall in response to camming means actuation may be employed to initiate release of the associated wheel brake.

In a particularly preferred arrangement for reducing the clutch torque the clutch comprises two such clutch driving surfaces having frictional engagements with respective clutch driven surfaces, and the torque of the clutch is arranged to be varied by means arranged to vary the axial force on one of said frictional engagements.

The axial force acting on the other frictional engagement may be arranged to remain substantially constant.

Preferably a clutch member is sandwiched between two clutch discs which are keyed together against relative rotation but are capable of limited axial movement apart against resilient biassing, and the axial biassing force acting on the frictional engagement between a first of the discs and the clutch member is varied by means arranged to apply a variable force acting in the direction to urge the clutch member and the first disc relatively apart.

The axial force of engagement between the first disc and the clutch member will then be equal to the difference between the force of said resilient biassing and the magnitude of said variable force. Usually it will be arranged that the magnitude of the variable force is at all times less than the resilient biassing force, so that the first disc will not in fact separate from the clutch member.

Although the clutch member may be carried by the shaft to act as a clutch driving member, it is preferred that the clutch discs are carried by the shaft, to constitute clutch driving members, said clutch member then constituting a clutch driven member.

The clutch driven member is preferably then constituted by a portion of said thrust member in a particularly advantageous arrangement in which the flywheel is axially movable relative to the shaft by said camming means against further biassing means which provides said variable force, and means is provided to increase the force exerted by the further biassing means on the flywheel following camming means actuation.

Preferably the further biassing means comprises a resiliently biassed lever assembly of which the fulcrum point is displaced to alter the mechanical advantage of the lever following camming means actuation.

The lever is preferably arranged to operate a dump valve of said pressure-regulating means.

In yet another arrangement the biassing of the clutch may be varied by magnetic means.

The magnetic means may be arranged to produce a magnetic biassing force on the clutch which increases on camming means actuation to counteract a further biassing force.

Alternatively, the clutch may be biassed by resilient means, and the loading of the resilient means may be varied by displacement of an armature by an electrical coil.

The means for providing an electrical signal controlling energisation of the electrical coil preferably comprises a photo-cell which detects displacement of a rotor in response to camming means actuation.

Preferably the output of the photo-cell is then also employed to provide an electrical signal initiating release of the associated wheel brake.

According to a second aspect of the invention in a flywheel mechanism of the kind set forth the clutch comprises a clutch plate of which at least a portion is axially movable relative to the shaft in response to actuation of the camming means, and the pressure-regulating means is responsive to axial movement of said movable portion, the plate being retained against angular movement relative to the shaft by drive connections between the radially outer periphery of the plate and a drive member fast with the shaft.

The invention will now be further described, by way of example only, with reference to the accompanying drawings in which.

Figure 1:
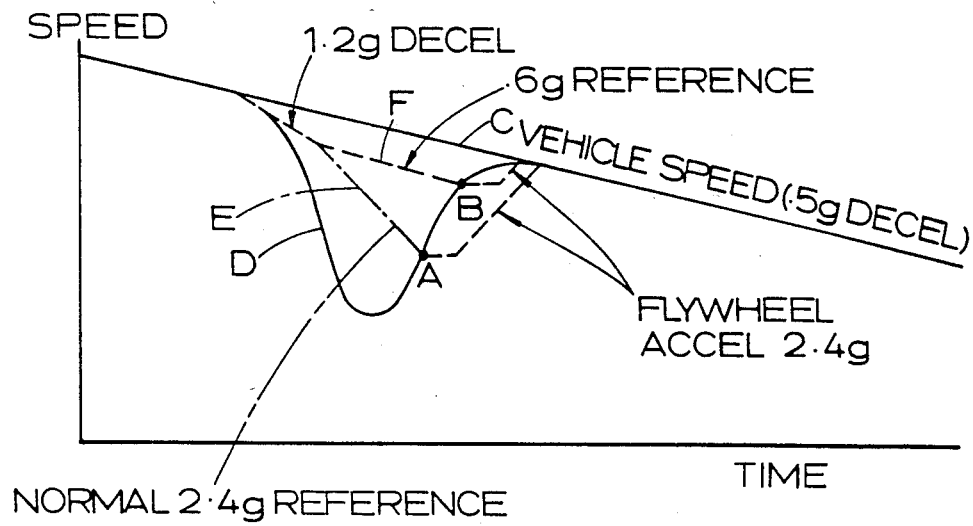
FIG. 1 is a graph illustrating a problem tackled by the invention.

In FIG. 1 the straight line C is a plot of the speed of a heavy commercial vehicle decelerating at 0.5 g, which is about the maximum deceleration achievable in practice with such vehicles. Plot D is of the speed of a braked wheel of the vehicle executing a cycle of brake release/re-apply. Plot E is how the flywheel speed of the prior art arrangements would behave if a prior art arrangement were to be applied to the commercial vehicle, with the deceleration threshold of the camming means set at 1.2 g but the setting of the clutch being set to require a flywheel deceleration of 2.4 g to slip the axially biassed clutch. The plots E and D intersect at point A, the speed of a decelerating flywheel becoming the same again as that of the accelerating shaft, and it is at that point that the camming means would be deactuated in the prior art arrangement. It will be seen that the plot E represents a poor analogue of the vehicle speed, which would be more accurately represented by a plot F, and the point A would be much too early in many cases to re-apply the brake. The invention is aimed at providing a construction which performs substantially in accordance with plot F to provide re-application of the brake from point B.

Figure 2:
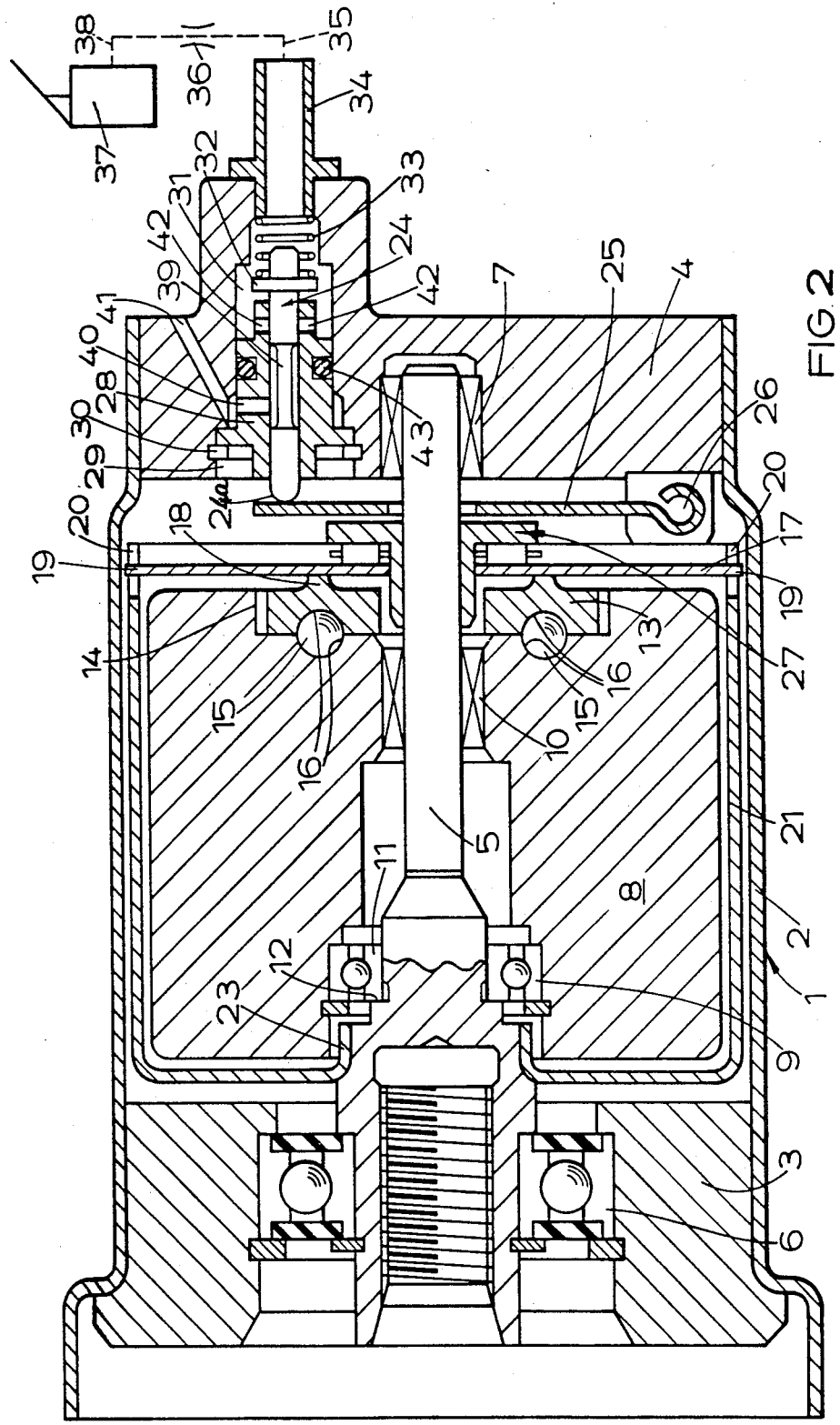
FIG. 2 is an axial cross-section of a flywheel mechanism in accordance with the invention, the mechanism being shown in the unactuated condition.

The flywheel mechanism of FIG. 2 comprises a stationary housing 1 which preferably forms part of a vehicle hub, the housing 1 consisting of a tubular shell 2 rigidly secured to opposed end closures 3 and 4. An axial shaft 5 is rotatably mounted in bearings 6 and 7 carried by closures 3 and 4 respectively. A substantially cylindrical flywheel 8 is journalled on shaft 5 by spaced bearings 9 and 10, the inner race 11 of bearing 9 abutting a shoulder 12 on shaft 5 to hold the flywheel 8 against leftward movement relative to the shaft 5.

A thrust member in the form of a plate 13 is housed within a circular recess 14 in the right hand end of the flywheel 8. A camming means is constituted by four circumferentially spaced balls 15 cooperating with ramp pockets 16 formed in the opposed faces of the plate 13 and flywheel 8. An annular rigid clutch plate 17 has a clutching engagement on its left hand face with an annular projection 18 on thrust plate 13 and is provided on its outer periphery with a pair of diametrically opposed projections 19 which are axially slidable within respective axial slots 20 provided in the rim of a cup-shaped drive member 21 the base 22 of which is secured to the shaft 5 by a depending sleeve 23. The clutch plate 17 is thereby held against angular movement relative to shaft 5, but can move axially relative to the shaft as permitted by the slots 20. Since the sliding connections between the shaft 5 and the clutch plate 17 provided by the projections 19 and slots 20 are at a relatively large radius, the friction forces opposing relative axial movement are kept to a minimum.

A common axial biassing means for the clutch plate 17 and camming means 15, 16 is provided by a piston 24 acting at 24a on the free end of a lever 25 which is pivoted at 26 on closure 4 and acts on a thrust bearing assembly 27 engaging the right hand face of clutch plate 17.

Piston 24 is slidable in the axial bore of a stepped valve body 28 retained in a stepped bore 29 of closure 4 by a retaining ring 30. The right hand end of the piston 24 projects into a chamber 31 defined between the valve body 28 and the right hand end of bore 29, and is provided with an abutment flange 32 for a light coiled compression spring 33 which contributes to the clutch biassing force. Chamber 31 is connected by way of tubular connector 34 and line 35, which incorporates a restrictor 36, with one outlet 38 of a brake-applying treadle valve 37, so that on application of the brakes air is supplied via restrictor 36 to chamber 31 to provide a fluid pressure force acting leftwardly on the piston 24 to increase the force of engagement between clutch plate 17 and thrust member 13.

Valve member 24 is provided with an intermediate portion 39 of reduced diameter, and valve body 28 is provided with a radial port 40 communicating permanently with atmosphere by way of passage 41, and with radial ports 42 communicating permanently with chamber 31. An O-ring 43 received in an external annular recess of valve body 28 normally isolates chamber 31 from port 41. The ports 40, 42 in conjunction with the piston portion 39 provide a pressure relief valve as will be explained.

The operation of the FIG. 2 mechanism will now be described with reference to FIG. 3. On application of the vehicle brake by valve 37 chamber 31 is pressurized to provide in conjunction with spring 33 an axial biassing force on the clutch 17, 18 and on the camming means 15, 16 indicated at G in FIG. 3. The shaft 5 decelerates with the braked wheel connected to it, and initially the thrust member 13 and flywheel 8 continue to be driven in synchronism with the shaft 5 by the clutch 17, 18 which does not initially slip. The position of the parts are then as shown in FIG. 2. The initial clutch loading at G is arranged to be sufficient to ensure that the clutch does not slip before camming means actuation is initiated when the shaft deceleration reaches the deceleration threshold, 1.2 g in this case, of the camming means. For example, a clutch loading corresponding to a flywheel deceleration of 2.4 g may be employed. When the deceleration threshold of the camming means is reached by the shaft 5 the flywheel 8 will begin to overrun the thrust member 13 and the cooperation between balls 15 and ramp recesses 16 will urge the thrust member 13 rightwardly to displace piston 24 rightwardly against the pressure in chamber 31 and the spring 33. The compression of the spring 33 will lead to an increase in force in chamber 31 as piston 24 initially moves to the right to give the portion H of FIG. 3. This initial increase in the biassing force on the camming means 15, 16 and clutch 17, 18 is desirable to prevent inadvertent camming means actuation by tyre 'wind up'. At point J the piston 24 has moved sufficiently to the right for the portion 39 to begin to uncover inner ends of ports 42 and thereby suddenly connect chamber 31 with atmosphere by way of port 40 and passage 41. The biassing force on the clutch 17, 18 and camming means 15, 16 is thereby suddenly reduced, as indicated by line K in FIG. 3, to a new value L determined entirely by the loadiang of spring 33 which is chosen to provide a clutch torque which will decelerate the flywheel 8 at a rate of 0.6 g whilst the flywheel overruns the shaft 5. Thus the speed of the over-running flywheel will follow in FIG. 1 the path F until at point B the speed of the decelerating flywheel becomes the same again as that of the shaft 5 whereupon the camming means 15, 16 will be de-actuated by reverse angular movement of the flywheel relative to the thrust member 13, and the flywheel will be accelerated by the accelerating shaft. Since the clutch setting will now have returned to 2.4 g due to disabling of the relief valve 39, 40, 42 on reverse movement of piston 24, the clutch can accelerate the flywheel at a rate of up to 2.4 g, as indicated in FIG. 1.

Thus, the construction of FIG. 2 provides a normal clutch setting corresponding to 2.4 g, a deceleration threshold of 1.2 g, and yet an over-running flywheel deceleration of only 0.6 g.

Figure 3:
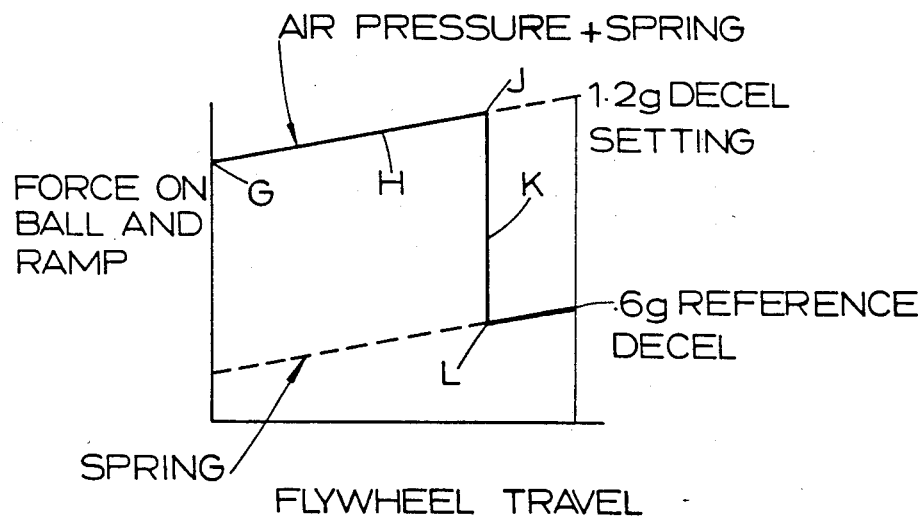
FIG. 3 is a graph illustrating the operation of the mechanism of FIG. 2.

The drop in pressure in chamber 31 on connection of that chamber to atmosphere at point J in FIG. 3 may conveniently be used to initiate reduction of the wheel brake pressure by the use of a suitable pressure sensor.

In addition to providing a convenient connection between the shaft 5 and the clutch plate 17, the drive member 21 substantially encloses the flywheel 8 to reduce the drag caused by entrainment of air, 'windage', by the flywheel 8.

Figure 4:
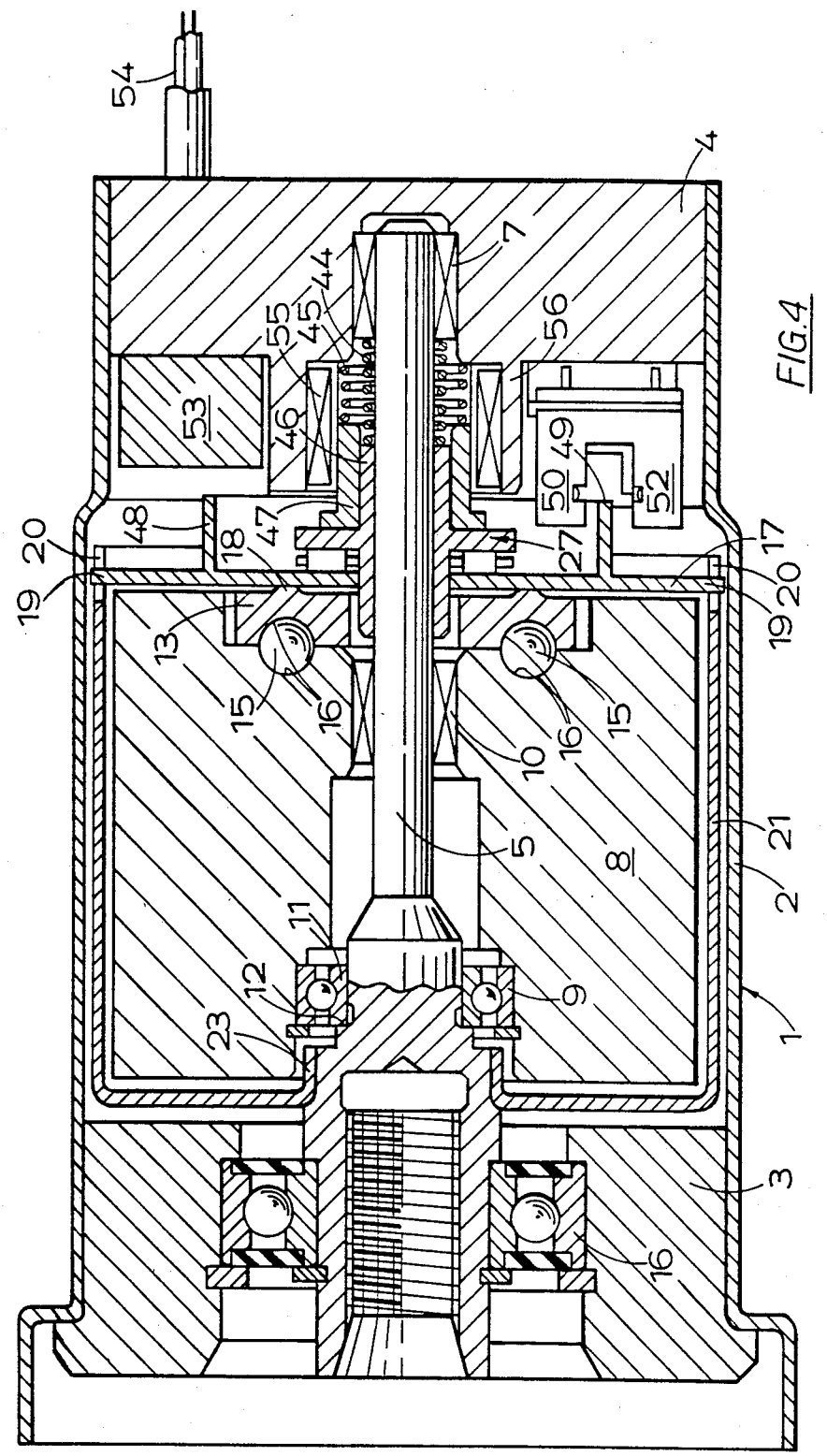
FIG. 4 is a view similar to FIG. 2 but of a modification.

In FIG. 4, parts corresponding to those of FIG. 2 have been given corresponding reference numerals. This construction differs from that of FIG. 2 in the arrangement of the axial biassing means for the clutch. The normal loading of the clutch 17, 18 and camming means 15, 16 is provided by two concentric compression springs 44 and 45 acting in unison, the radially inner spring 44 acting between bearing 7 and the right hand end of a sleeve 46 of the thrust assembly 27, and the radially outer spring 45 acting between the closure 4 and the righthand end of a tubular armature 47 axially slidable on sleeve 46.

Clutch plate 17 is integrally provided with a sensor rotor in the form of a short sleeve 48 the peripheral edge 49 of which is positioned just clear of a radial light path between a light emitter 50 and a photocell 52, the parts being shown in their normal, unactuated condition.

The two springs 44, 45 can be arranged to provide a normal setting of the clutch 17, 18 corresponding to a flywheel deceleration of, say, 2.4 g and provide a deceleration threshold of, say, 1.2 g for the camming means 15, 16. On actuation of the camming means the edge 49 of rotor 48 will be displaced rightwards to interrupt the light falling on photo-cell 52 to provide an electrical signal to electronic control unit 53 which is arranged to provide an electrical signal on leads 54 for releasing the brake and to provide D.C. energisation of a coil 55 mounted within an inwardly directed tubular extension 56 of closure 4 to draw armature 47 rightwards against the spring 45. Movement of the armature 47 disables spring 45 so that the clutch and camming means load is suddenly reduced to that provided by spring 44 alone. Spring 44 can therefore be chosen to give a load corresponding to, say, a 0.6 g deceleration of the flywheel 8 to allow over-running of the flywheel at a deceleration of 0.6 g as with the embodiment of FIG. 2.

On deactuation of the camming means when the flywheel speed and the speed of the shaft become the same again the photocell is uncovered to provide an electrical signal for de-energising the solenoid 55 and re-applying the brake.

Figure 5:
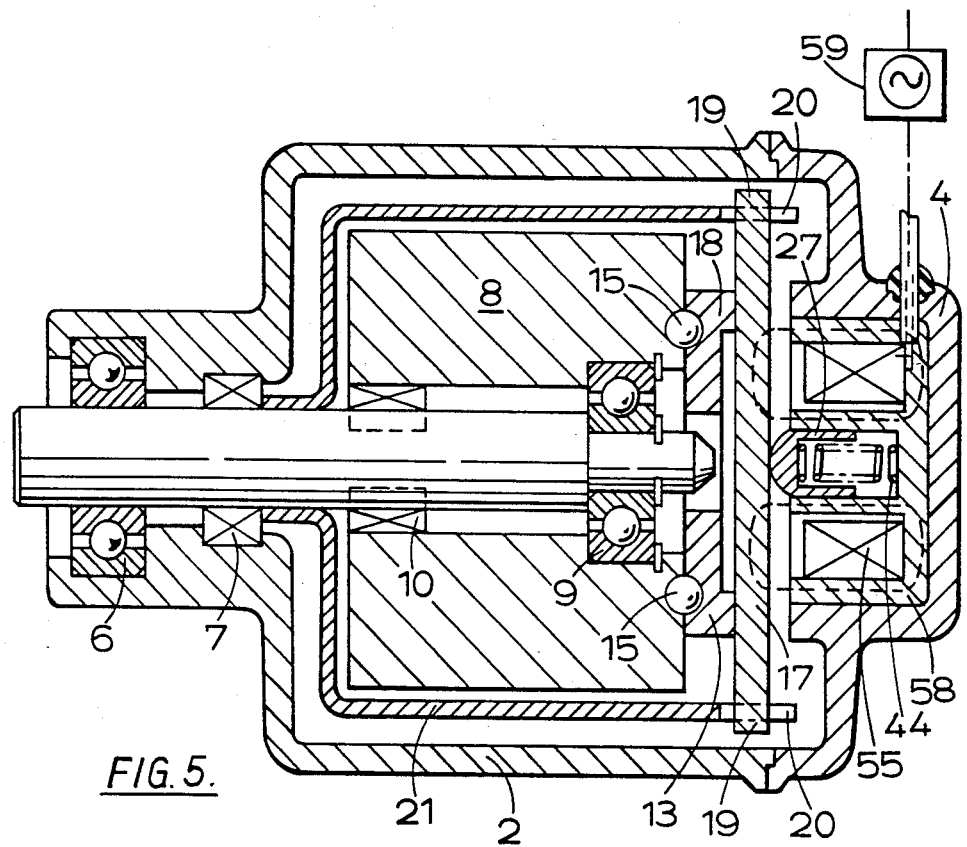
FIG. 5 is a schematic view of a further modification.

FIG. 5 schematically shows a further mechanism in which magnetic forces are employed to reduce the axial biassing force on the clutch and camming means following camming means actuation. Corresponding reference numerals have been applied to the principal parts corresponding to those of FIGS. 2 and 4. In this embodiment the normal loading of the camming means 16 and clutch 17, 18 is provided by a single compression spring 44 acting through a cup-shaped thrust member 27. Annular coil 55 is fixedly mounted within a flux carrier 57 of U-shape in radial cross-section, the free ends 58 of the U facing the clutch plate 17. Coil 55 is energised continuously by an A.C. source 59, and the resulting lines of flux which pass through the clutch plate 17, made of suitable material to carry magnetic flux, are indicated by dotted lines in FIG. 5.

Figure 6:
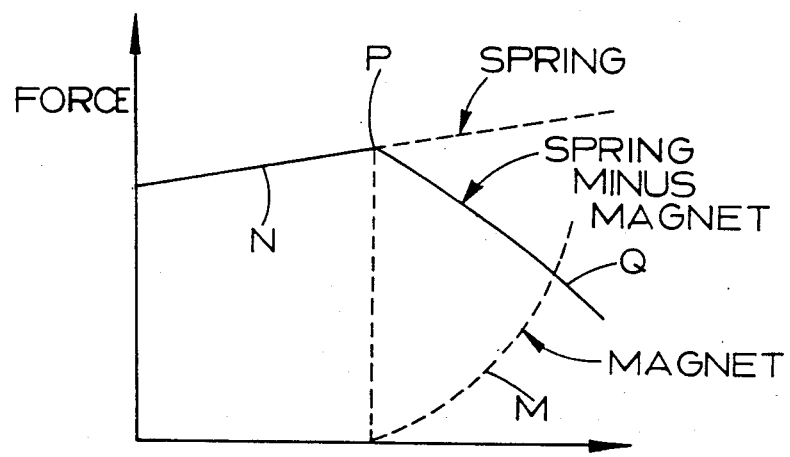
FIG. 6 is a graph illustrating the operation of the mechanism of FIG. 5.

The operation of the FIG. 5 embodiment will now be described with reference to FIG. 6. In the unactuated condition of the camming means 16 the clutch plate 17 experiences substantially no magnetic attraction by coil 55 due to its spacing from the magnet ends 58 and the inverse square attraction characteristic of the magnet shown by plot M in FIG. 6, and the normal biassing force is therefore that of the spring 44. On actuation of the camming means clutch plate 17 is moved rightwards, and initially only the increasing force of the spring is experienced, as indicated by the line N. However, at point P the force of magnetic attraction on the plate 17 becomes significant and on further displacement of the plate 17 to the right the magnet force increasingly counteracts the loading of spring 44 to produce a net reduction in the biassing force, indicated by the plot Q.

The effect produced on the electrical characteristics of the coil 55 by axial movement of the clutch plate 17 may be detected by suitable electronic means and used to generate a brake release signal at the appropriate stage in the actuation of the camming means.

Figure 7:
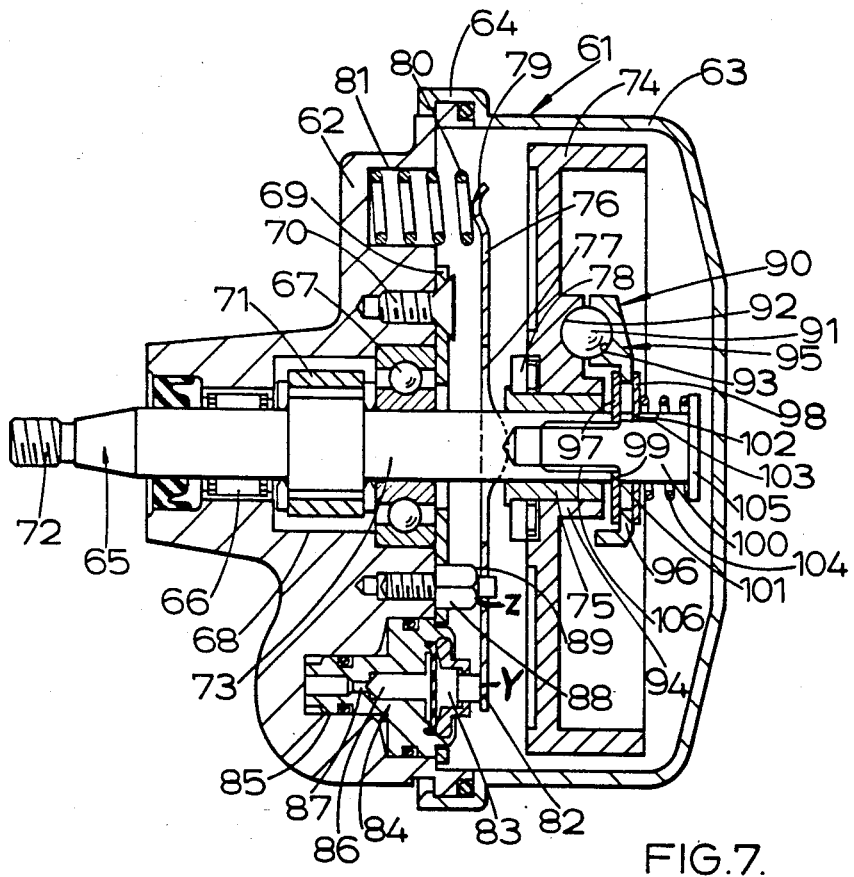
FIG. 7 is an axial cross-section of a further flywheel mechanism in accordance with the invention.

The flywheel mechanism of FIG. 7 comprises a stationary housing 61 consisting of a housing body 62 and a housing shell 63 sealingly secured at its periphery 64 to the housing body 62. A drive shaft 65 is rotatably mounted in axially spaced bearings 66, 67 located in a stepped axial bore 68 of the housing body 62, the shaft 65 being retained against axial movement by a retaining plate 69 engaging with the outer race of the bearing 67 and secured in position by circumferentially spaced retaining screws 70. An eccentric 71 is mounted on shaft 65 for driving a pump, not shown, which effects re-application of the brakes following brake release effected by the flywheel mechanism.

The left-hand end 72 of shaft 65 projects outwardly of the housing body 62 for connection to a vehicle wheel and the right-hand portion 73 carries a flywheel 74 housed inside shell 63. Flywheel 74 is rotatable and axially slidable relative to shaft 65, being mounted on the shaft by a bushing 75. The flywheel is biassed rightwardly by a lever 76 which has a bifurcated central portion 77 acting on the flywheel through a thrust bearing assembly 78. The upper end 79 of the lever is engaged by an axially extending pre-loaded compression spring 80 located in a bore 81 of the housing body 62, and the lower end 82 of the lever bears upon a fulcrum point Y of the outer end of a control plunger 83 of a dump valve assembly 84 located in a stepped bore 85 of the body 62 by retaining plate 69. The inner end 86 of control plunger 83 is coned to control a dump passage 87.

At a position substantially midway between the shaft 73 and lever end 82 the lever 76 loosely receives the outer end of a shouldered fulcrum pin 88, threadedly secured to body 62, but in the normal position of the lever, as shown in FIG. 7 in which the flywheel is in its rightward position, the lever is spaced slightly from the shoulder 89 on the pin 88.

A ball and ramp camming means 90 is constituted by three circumferentially spaced balls 91 cooperating in well known manner with respective pairs of inclined recesses 92, 93 provided in opposed faces of the flywheel hub 94 and a thrust member 95 respectively. Thrust member 95 includes a radially inner portion in the form of a flange 96 which is clamped axially between first and second clutch discs 97 and 98 respectively. The flange 96 and discs 97, 98 constitute a clutch assembly acting between shaft 65 and thrust member 95.

The first clutch disc 97 is firmly secured to shaft 65 by clamping between a shoulder 99 on a shaft extension piece 100 and the free end 101 of shaft 65, the extension piece 100 being threadedly secured in an axial bore 106 provided in the shaft 65.

The second clutch disc 98 is axially movable on extension piece 100, but is keyed thereto against relative angular movement by a key 102 engaged in a keyway 103 extending from shoulder 99, and the disc 98 is resiliently biassed against flange 96 by a preloaded coiled compression spring 104 bearing against a terminal flange 105 provided on the extension piece 100.

The operation of the flywheel assembly will now be described. The parts are shown in their normal positions in FIG. 7, the positions they occupy when the shaft deceleration does not exceed the deceleration threshold corresponding to the flywheel deceleration at which the camming means 90 is expanded. As previously mentioned, the lever 76 in this condition does not engage with shoulder 89.

On braking of the vehicle wheel in a potential skid situation the initial deceleration of shaft 65 by the vehicle wheel results in a corresponding deceleration of the flywheel 74, the deceleration torque being conveyed from the shaft 65 by way of clutch discs 97, 98, thrust member 95 and balls 91. In this condition both clutch discs 97, 98 are fully loaded against flange 96 to provide a maximum torque setting of the clutch assembly to ensure that the clutch does not slip prior to expansion of camming means 90.

If the preload force of spring 104 is designated $F_S$, and the preload force of lever spring 80 is designated $F_L$, then initially the lever 76 exerts an axial force of $2F_L$ on the flywheel 74 due to the fact that initially the lever 76 is fulcrumed on the control plunger 83 at the fulcrum point Y.

The torque available in the clutch engagement between second clutch disc 98 and flange 96 is substantially constant throughout the operation of the assembly since it is determined by the loading of spring 104 which will remain effectively constant despite any slight rightward displacement of second disc 98 relative to shaft 65, due to the substantial preload force $F_S$ of that spring. However, the torque available in the clutch engagement between the first clutch disc 97 and the washer 96 will vary in dependence upon the axial force acting between flange 96 and first disc 97 which varies in use due to changes in the force exerted by lever 76 on the flywheel 74. For the first clutch disc 97 the following relationship will apply:

torque = axial force $F_1$ × friction coefficient × working clutch radius.

Since the force initially applied by lever 76 on the flywheel is $2F_L$ the axial force $F_1$ acting between first clutch disc 97 and flange 96 is initially $$F_1 = F_S - 2F_L$$

and $F_1$ is arranged to be positive to ensure a torque contribution from the first disc 97.

The camming means will initially be subjected to an axial force of $2F_L$, which is less than the spring force $F_S$ of spring 104, and this axial force determines the deceleration threshold of the camming means.

When the deceleration of shaft 65 exceeds the deceleration threshold of the camming means 90 the flywheel 74 is permitted to move angularly relative to thrust member 95 and the flywheel 74 is moved leftwards relative to shaft 65 by the cooperation between balls 91 and ramps 92, 93. Once the camming means has been expanded the torque of the clutch assembly is automatically reduced, as will now be explained, to enable the flywheel 74 to overrun the shaft 65 and be subjected to a relatively low deceleration torque by the clutch assembly.

When flywheel 74 is urged to the left from the position shown in FIG. 7 the lever 76 engages with shoulder 89 on fulcrum pin 88 at a fulcrum point Z, and the lever then fulcrums about fulcrum point Z of shoulder 89. Since the centre of the flywheel thrust bearing 78 is now proportionately closer to the fulcrum point relative to the distance of spring 80 from the fulcrum point, as compared with the normal condition, this results in an increase in the rightwards force applied by the lever 76 to the flywheel 74. As the lever end 82 moves rightwards the dump valve 86 is permitted to open under the brake pressure acting in passage 87 and fluid is dumped from the associated brake actuator to reduce the brake forces.

Since the flywheel is subjected by lever 76 to an increased rightwards force the axial force $F_1$ between first clutch disc 97 and flange 96 is correspondingly reduced. Since the torque exerted on thrust member 95 by the second clutch disc 98 remains substantially constant, the net torque of the clutch assembly is reduced over the normal torque setting, so that the clutch torque exerted on the overrunning flywheel is less than the normal clutch torque. The overrunning flywheel is thereby subjected to a reduced clutch torque and generates the portion R-S of the graph of FIG. 8.

Figure 8:
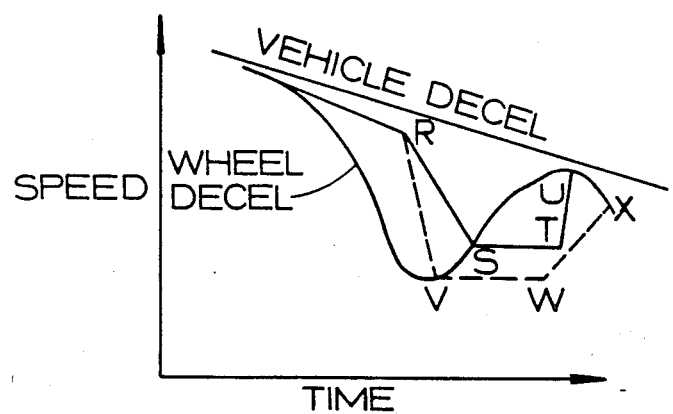
FIG. 8 is a graph illustrating the operation of the mechanism of FIG. 7.

When the speed of the decelerating flywheel coincides again with the speed of the shaft 65, at point S in FIG. 8, the camming means 90 is deactuated and the flywheel moves rightwards relative to shaft 65 to its normal position. During this return movement of the flywheel the dump valve 86 closes and lever 76 moves out of abutment with fulcrum pin 88, thereby reducing the axial force applied to the flywheel thrust bearing 78, and thus increasing the axial force $F_1$ between first clutch disc 97 and flange 96. This reinstates the normal torque of the clutch assembly to enable the shaft 65 to accelerate the flywheel 74 at a substantially greater rate than the previous rate of deceleration of the overrunning flywheel, to generate portion T-U of the graph.

For comparison purposes, in FIG. 8 the discontinuous lines are a plot of how the mechanism of FIG. 7 would operate if the clutch disc 97 were to be removed, and if disc 98 were to be secured to shaft piece 100. Such an arrangement (not in accordance with the invention) would have a clutch torque that increases at point R, rather than decreases, following camming means actuation, and this would give the undesirably steep portion R-V of the plot. On resetting of the camming means the clutch torque would be reduced for acceleration of the flywheel to produce the portion W-X of the plot, and it should be noted that the point X is undesirably far removed from the peak of the wheel speed curve.

It will be appreciated that although the second clutch disc 98 is capable of axial movement against spring 104, only sufficient movement takes place to bring about the changes in axial force $F_1$ between the first disc 97 and the washer 96, whereas a substantially greater axial movement of the flywheel is produced.

In a modification, not shown, the radius of the first clutch plate 97 is increased to provide an increase in the change of torque between the two conditions of the clutch assembly.

We claim:

1. In a flywheel mechanism for an anti-skid braking system comprising a rotatable shaft for driving by a braked wheel, a flywheel which is angularly movable with respect to said shaft, a thrust member, camming means acting between said thrust member and said flywheel and through which rotation of said shaft is imparted to said flywheel from said thrust member, a normally closed dump valve for controlling a brake-applying fluid pressure, said camming means being so arranged that relative rotation between said flywheel and said thrust member as a result of excessive deceleration of said thrust member relative to said flywheel is accompanied by relative movement between said flywheel and said thrust member in an axial direction to open said dump valve, and a clutch interposed between said shaft and said flywheel, said clutch comprising driving and driven surfaces, means axially biassing said surfaces into frictional engagement with each other to exert a torque of a normal value on said flywheel which torque permits said flywheel to overrun said shaft, the improvement comprising means responsive to actuation of said camming means upon excessive deceleration of said thrust member relative to said flywheel for reducing said clutch torque from said normal value to a lesser value following actuation of said camming means.

2. A flywheel mechanism as in claim 1 wherein said means biassing said surfaces into frictional engagement comprises a movable wall subject to fluid pressure forces, and means arranged to vary said fluid pressure forces to reduce the force on the clutch and its torque on said flywheel in response to actuation of said camming means.

3. A flywheel mechanism as in claim 2 wherein said pressure varying means comprises a pressure relief valve for reducing the fluid pressure force on said clutch following actuation of said camming means.

4. A flywheel mechanism as in claim 2 wherein said movable wall comprises a piston bounding a pressure space, and including a restrictor for connecting said pressure space with a treadle valve.

5. A flywheel mechanism as in claim 1 wherein said clutch comprises two clutch driving surfaces having frictional engagements with respective clutch driven surfaces and wherein said means responsive to the actuation of said camming means operates to vary the axial force between one of said clutch driving surfaces and its driven surface.

6. A flywheel mechanism as in claim 5 including means for exerting a substantially constant axial force between the other of said clutch driving surfaces and its driven surface.

7. A flywheel mechanism as in claim 5 wherein said clutch driven surfaces are on a clutch member and said driving surfaces are on two clutch discs incapable of relative rotation but capable of limited axial movement apart against resilient biassing, said clutch member being sandwiched between said clutch discs, wherein the means responsive to the actuation of the camming means operates to vary the axial force between one of said discs and said clutch member.

8. A flywheel mechanism as in claim 7 wherein said clutch driven member is constituted by a portion of said thrust member, said flywheel being axially movable relative to said shaft by said camming means, other biassing means providing said varying force, and means for increasing the force exerted by said other biassing means on said flywheel following actuation of said camming means.

9. A flywheel mechanism as in claim 8 wherein said other biassing means comprises a resiliently biased lever assembly rockable about a fulcrum point, and means for displacing said fulcrum point to alter the mechanical advantage of said lever following actuation of said camming means.

10. A flywheel mechanism as in claim 1 wherein one of said clutch surfaces is carried by a magnetically responsive body, and the means responsive to actuation of said camming means comprises magnetic means for exerting a force on said magnetically responsive body.

11. A flywheel mechanism as in claim 10 including means for exerting a further biassing force on said surfaces, said magnetic means being arranged to produce a magnetic biassing force on said body which increases on actuation of said camming means to counteract said further biassing force.

12. A flywheel mechanism as claimed in claim 10 including resilient means biassing said clutch, and an armature of an electrical coil located to vary the loading of said resilient means upon displacement of said armature.

* * * * *